United States Patent
Levy-Abegnoli et al.

(10) Patent No.: US 9,608,863 B2
(45) Date of Patent: Mar. 28, 2017

(54) ADDRESS AUTOCONFIGURATION USING BLOOM FILTER PARAMETERS FOR UNIQUE ADDRESS COMPUTATION

(71) Applicant: Cisco Technology, Inc., San Jose, CA (US)

(72) Inventors: Eric Michel Levy-Abegnoli, Valbonne (FR); Pascal Thubert, La Colle sur Loup (FR); Patrick Wetterwald, Mouans Sartoux (FR)

(73) Assignee: Cisco Technology, Inc., San Jose, CA (US)

(*) Notice: Subject to any disclaimer, the term of this patent is extended or adjusted under 35 U.S.C. 154(b) by 181 days.

(21) Appl. No.: 14/516,799

(22) Filed: Oct. 17, 2014

(65) Prior Publication Data
US 2016/0112254 A1    Apr. 21, 2016

(51) Int. Cl.
| | |
|---|---|
| *G06F 15/177* | (2006.01) |
| *H04L 12/24* | (2006.01) |
| *H04L 12/26* | (2006.01) |
| *H04L 29/12* | (2006.01) |
| *H04L 12/743* | (2013.01) |

(52) U.S. Cl.
CPC ......... *H04L 41/0803* (2013.01); *H04L 43/10* (2013.01); *H04L 61/2092* (2013.01); *H04L 45/7453* (2013.01); *H04L 61/6059* (2013.01)

(58) Field of Classification Search
CPC ............. H04L 41/0803; H04L 45/7453; H04L 61/2092; H04L 61/6059
See application file for complete search history.

(56) References Cited

U.S. PATENT DOCUMENTS

| | | | |
|---|---|---|---|
| 7,333,464 B2 * | 2/2008 | Yang | ........................ H04L 67/16 370/252 |
| 7,633,921 B2 | 12/2009 | Thubert et al. | |
| 8,045,558 B2 | 10/2011 | Droms et al. | |
| 8,065,515 B2 | 11/2011 | Droms et al. | |
| 8,219,800 B2 | 7/2012 | Levy-Abegnoli et al. | |
| 8,266,427 B2 | 9/2012 | Thubert et al. | |
| 8,301,650 B1 | 10/2012 | Oliver | |
| 2005/0195832 A1 * | 9/2005 | Dharmapurikar | ... H04L 45/7457 370/395.31 |

(Continued)

OTHER PUBLICATIONS

Vyncke, Ed., et al., "Why Network-Layer Multicast is Not Always Efficient At Datalink Layer", Internet Engineering Task Force, Internet Draft, [online], Feb. 14, 2014, [retrieved on Sep. 2, 2014]. Retrieved from the Internet: <URL: http://tools.ietf.org/pdf/draft-vyncke-6man-mcast-not-efficient-01.pdf>, pp. 1-11.

(Continued)

*Primary Examiner* — Mohamed Wasel
(74) *Attorney, Agent, or Firm* — Leon R. Turkevich

(57) ABSTRACT

In one embodiment, a method comprises generating, by a network device, a Bloom filter bit vector based on applying Bloom filter parameters to a candidate address autoconfigured by the network device; and selectively repeating, by the network device, the autoconfiguring of the candidate address until the corresponding Bloom filter bit vector includes a bit set at a reserved bit vector position that is reserved for the network device, the reserved bit vector position providing uniqueness of the candidate address within a link layer domain.

20 Claims, 5 Drawing Sheets

(56) References Cited

U.S. PATENT DOCUMENTS

| | | | |
|---|---|---|---|
| 2007/0260602 A1* | 11/2007 | Taylor | G06F 19/22 |
| 2010/0023727 A1* | 1/2010 | Lim | H04L 45/745 |
| | | | 711/216 |
| 2010/0040066 A1* | 2/2010 | Hao | H04L 45/00 |
| | | | 370/395.31 |
| 2010/0040067 A1* | 2/2010 | Hao | H04L 45/00 |
| | | | 370/395.32 |
| 2012/0310960 A1 | 12/2012 | Watanabe et al. | |
| 2013/0103694 A1 | 4/2013 | Luong et al. | |
| 2013/0275715 A1* | 10/2013 | Caprioli | G06F 12/10 |
| | | | 711/203 |
| 2013/0287024 A1 | 10/2013 | Herberg et al. | |
| 2014/0244779 A1* | 8/2014 | Roitshtein | H04L 61/103 |
| | | | 709/213 |

OTHER PUBLICATIONS

Chakrabarti et al., "IPv6 Neighbor Discovery Optimizations for Wired and Wireless Networks", 6man WG, Internet Draft, [online], Jul. 4, 2014, [retrieved on Sep. 2, 2014]. Retrieved from the Internet: <URL: http://tools.ietf.org/pdf/draft-chakrabarti-nordmark-6man-efficient-nd-06.pdf>, pp. 1-34.

Wikipedia, "Bloom Filter", [online], Aug. 17, 2014, [retrieved on Sep. 2, 2014]. Retrieved from the Internet: <URL: http://en.wikipedia.org/w/index.php?title=Bloom_filter&printable=yes>, pp. 1-16.

Broder et al., "Network Applications of Bloom Filters: A Survey", Internet Mathematics vol. 1, No. 4, [online], [retrieved on Oct. 9, 2014]. Retrieved from the Internet: <URL: http://www.di.unipi.it/~ricci/im2005b.pdf>, pp. 485-509.

Shelby, Ed., et al., "Neighbor Discovery Optimization for IPv6 over Low-Power Wireless Personal Area Networks (6LoWPANs)", Internet Engineering Task Force, Request for Comments: 6775, pp. 1-55.

Winter, Ed., et al., "RPL: IPv6 Routing Protocol for Low-Power and Lossy Networks", Internet Engineering Task Force, Request for Comments: 6550, Mar. 2012, pp. 1-157.

Narten et al., "Neighbor Discovery for IP Version 6 (IPv6)", Network Working Group, Request for Comments: 2461, Dec. 1998, pp. 1-93.

Arkko et al., "SEcure Neighbor Discovery (SEND)", Network Working Group, Request for Comments: 3971, Mar. 2005, pp. 1-56.

Aura, "Cryptographically Generated Addresses (CGA)", Network Working Group, Request for Comments: 3972, Mar. 2005, pp. 1-22.

Thubert et al., U.S. Appl. No. 14/516,707, filed Oct. 17, 2014.

Jeffrey et al., "Understanding Bloom Filter Intersection for Lazy Address-Set Disambiguation", Proceedings of the 23rd ACM Symposium on Parallelism in Algorithms and Architectures, SPAA '11, Jan. 1, 2011, XP055093837, 10 pages.

Fernandes et al., "An Efficient Filter-based Addressing Protocol for Autoconfiguration of Mobile Ad Hoc Networks", INFOCOM 2009, The 28th Conference on Computer Communications, IEEE, Piscataway, NJ, Apr. 19, 2009, XP031469013, pp. 2464-2472.

* cited by examiner

US 9,608,863 B2

ADDRESS AUTOCONFIGURATION USING BLOOM FILTER PARAMETERS FOR UNIQUE ADDRESS COMPUTATION

TECHNICAL FIELD

The present disclosure generally relates to address autoconfiguration by a host network device in an Internet Protocol (IP) data network, more particularly to address autoconfiguration using Bloom Filter parameters for unique address computation.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing stateless autoconfiguration techniques enable an IPv6 device (e.g., host device) to create its own autoconfigured IPv6 address in response to a received router advertisement message specifying a link prefix advertised by an advertising router device. The IPv6 device can create the autoconfigured IPv6 address based on concatenating the link prefix with a suffix (e.g., an Extended Unique Identifier (EUI-64) link layer device address, a randomly-generated number, etc.).

The IPv6 device initiates a duplicate address detection (DAD) procedure to determine from another IPv6 device whether the autoconfigured IPv6 address is use: the IPv6 device can initiate the DAD procedure based on broadcasting/multicasting a query (e.g., a Neighbor Solicitation message) to all IPv6 devices in the link layer domain; alternately the IPv6 device can send a unicast address registration message to a router and await an acknowledgement from the router that there is not any duplicate address detected.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
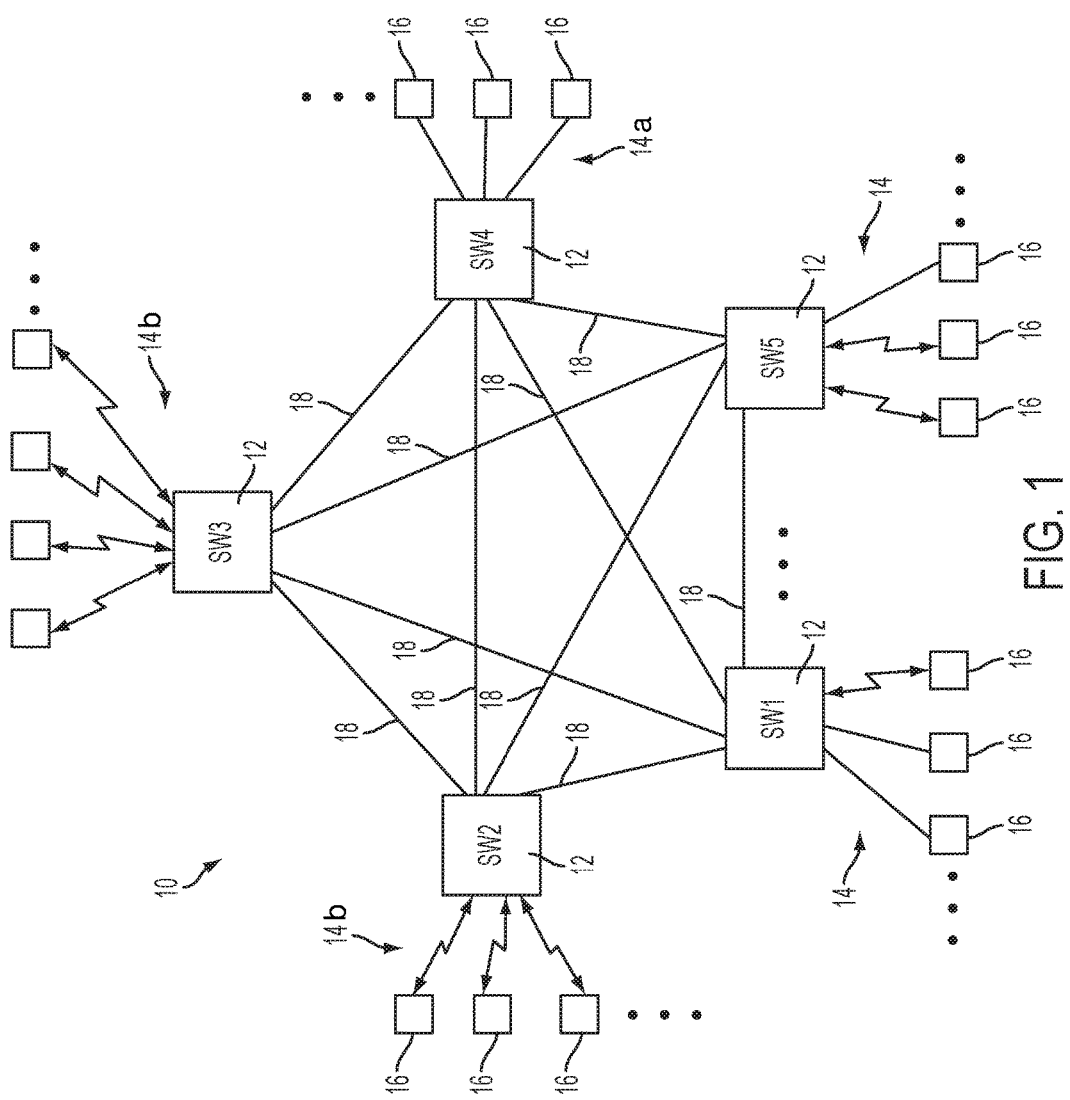
FIG. 1 illustrates an example system having an apparatus for providing Bloom filter parameters to a network device for unique address computation by the network device, according to an example embodiment.

In one embodiment, a method comprises generating, by a network device, a Bloom filter bit vector based on applying Bloom filter parameters to a candidate address autoconfigured by the network device; and selectively repeating, by the network device, the autoconfiguring of the candidate address until the corresponding Bloom filter bit vector includes a bit set at a reserved bit vector position that is reserved for the network device, the reserved bit vector position providing uniqueness of the candidate address within a link layer domain.

In another embodiment, an apparatus comprises a memory circuit and a processor circuit. The memory circuit is configured for storing Bloom filter parameters and an identification of one or more reserved bit vector positions that are reserved for the apparatus. The processor circuit is configured for generating a Bloom filter bit vector based on applying the Bloom filter parameters to a candidate address autoconfigured by the processor circuit. The processor circuit further is configured for selectively repeating the autoconfiguring of the candidate address until the corresponding Bloom filter bit vector includes a bit set at at least one of the reserved bit vector positions, the at least one reserved bit vector position providing uniqueness of the candidate address within a link layer domain.

In another embodiment, logic is encoded in one or more non-transitory tangible media for execution by a machine and when executed by the machine operable for: generating, by a network device, a Bloom filter bit vector based on applying Bloom filter parameters to a candidate address autoconfigured by the network device; and selectively repeating, by the network device, the autoconfiguring of the candidate address until the corresponding Bloom filter bit vector includes a bit set at a reserved bit vector position that is reserved for the network device, the reserved bit vector position providing uniqueness of the candidate address within a link layer domain.

In another embodiment, a method comprises allocating, by a first network device, one or more reserved bit vector positions to a second network device having connected to the first network device; and the first network device sending a message specifying at least the one or more reserved bit vector positions to the second network device, enabling the second network device to autoconfigure an address that is unique within a link layer domain of the first network device, based on the second network device determining that applying Bloom filter parameters to the address results in a Bloom filter bit vector having at least one bit set at the one or more reserved bit vector positions.

In another embodiment, an apparatus comprises a processor circuit and a device interface circuit. The processor circuit is configured allocating one or more reserved bit vector positions to a network device having connected to the apparatus. The device interface circuit is configured for sending a message specifying at least the one or more reserved bit vector positions to the network device, enabling the network device to autoconfigure an address that is unique within a link layer domain of the apparatus, based on the network device determining that applying Bloom filter parameters to the address results in a Bloom filter bit vector having at least one bit set at the one or more reserved bit vector positions.

In another embodiment, logic is encoded in one or more non-transitory tangible media for execution by a machine and when executed by the machine operable for: allocating, by a first network device, one or more reserved bit vector positions to a second network device having connected to the first network device; and the first network device sending a message specifying at least the one or more reserved bit vector positions to the second network device, enabling the second network device to autoconfigure an address that is unique within a link layer domain of the first network device, based on the second network device determining that applying Bloom filter parameters to the address results in a Bloom filter bit vector having at least one bit set at the one or more reserved bit vector positions.

DETAILED DESCRIPTION

Particular embodiments enable each network device in a data network (e.g., an IPv6 network) to ensure that its autoconfigured device network address (e.g., IPv6 address) is unique at least within a link layer domain, based on the autoconfigured IPv6 address mapping to a Bloom filter bit vector that includes a bit set at a reserved bit vector position that is reserved for the network device.

Conventional deployment of duplicate address detection (DAD) in a large IPv6 network can cause a large propagation of multicast traffic throughout the IPv6 network, especially in Internet of Things (IoT) networks having thousands of sensor nodes or higher. Further, prior neighbor discovery techniques required a network device to defend its IP address, which is not practical in battery-operated, resource-constrained devices such as sensor devices that maintain an idle state (e.g., "sleeping") for extended time periods.

A Bloom filter is a space-efficient probabilistic data structure implemented as a bit array of "N" bits to test whether an element is a member of a set: the test result is that an element is either "possibly in the set," or "definitely not in the set"; hence, a false positive result is possible in a Bloom filter, but a false negative is not possible.

According to an example embodiment, a Bloom filter can be used to enable a network device to autoconfigure a candidate device address to a unique address value. Each network device in the data network is allocated a corresponding one or more reserved bit vector positions that are not allocated to any other network device in the data network. The network device can selectively repeat address autoconfiguration until a candidate device address maps to the Bloom filter bit vector having a bit set at one or more of the reserved bit vector positions; in other words, a network device is not permitted to use an autoconfigured network address unless the network address maps to a Bloom filter bit vector having at least one bit set at one of the reserved bit vector positions (according to prescribed hash functions used to generate the Bloom filter bit vector). The reserved bit vector position(s) can be received by the network device from a second network device authorized to allocate the reserved bit vector position(s) to enable the network device to verify the uniqueness of a candidate network address; in other words, the reserved bit vector position(s) are not allocated to any other network device at least in the link layer domain, or within a prescribed domain of the data network (e.g., within a prescribed autonomous system). The device allocating the reserved bit vector position(s) can be a switching device providing an access link to the network device for reaching the data network, or another device in communication with the network device. The device allocating the reserved bit vector position(s) (e.g., a switching device or router device) can coordinate with other network devices to guarantee uniqueness among the reserved bit vector positions, for example based on the network devices allocating unique Bloom filter bit vector ranges.

Hence, the example embodiments entirely eliminate the necessity of Duplicate Address Detection (DAD) messages, as each network device can autoconfigure a network address that is unique based on the reserved bit vector position(s).

Hence, the example embodiments provide scalable address autoconfiguration in large-scale networks employing large numbers of host network devices, such as deployment of Internet of Things (IoT) having sensor devices, based on one or more network devices allocating unique reserved bit vector position(s) (i.e., "allocating network devices") to one or more network devices having connected to the one or more allocating network devices allocating the reserved bit vector positions, enabling each network device to autoconfigure an IPv6 address that is unique at least within a link layer domain of the allocating network device.

FIG. 1 is a diagram illustrating an example network 10 having one or more allocating network devices 12 providing link layer connections 14 for network devices 16 in the network 10, according to an example embodiment. The network can be implemented as a local area network (LAN) and/or a wide area network (LAN). Each allocating network device (illustrated for example as a switching device, e.g., SW1, SW2, SW3, SW4, and SW5) 12 can be configured for providing a link layer connection 14 that enables a network device 16 to attach to the corresponding switching device 12 according to a prescribed link layer and/or routing protocol. Each allocating network device 12 can be implemented as a link layer (Layer 2) access device such as a wired or wireless link layer access device, a link layer switch, a wireless LAN controller, and/or a network layer (Layer 3) router device, etc. Hence, the allocating network device 12 also can be referred to as a "first-hop" network device or an "access device" providing link layer access to the network 10 for the network devices 10. For convenience, the allocating network device 12 will be referred to as a "switching device" 12.

Each link layer connection 14 can be a wired link (e.g., Ethernet/IEEE 802 10/100/1000 MB/s) 14a or a wireless link (e.g., WiFi, infrared, Bluetooth, etc.) 14b. Hence each network device 16 can have one or more wired links 14a and/or one or more wireless links 14b with one or more switching devices 12. An example network device can be a sensor device (e.g., an IoT "mote") having a wired or wireless device interface circuit for wired or wireless communications in the network 10.

Each switching device 12 also can have one or more inter-switch links 18 that can connect the switching device 12 to another switching device 12, a router device, a server device, etc., for transport of data packets between the switching devices 12.

As described in further detail below with respect to FIGS. 3-5, the switching devices 12 can allocate amongst each other, a prescribed reservation space within the range of the network-wide Bloom filter bit vector. Hence, each switching device 12 can send to each attached network device 16 one or more reserved bit vector positions, from the prescribed reservation space, that provides uniqueness of a candidate IPv6 address within the entire network 10.

Figure 2:
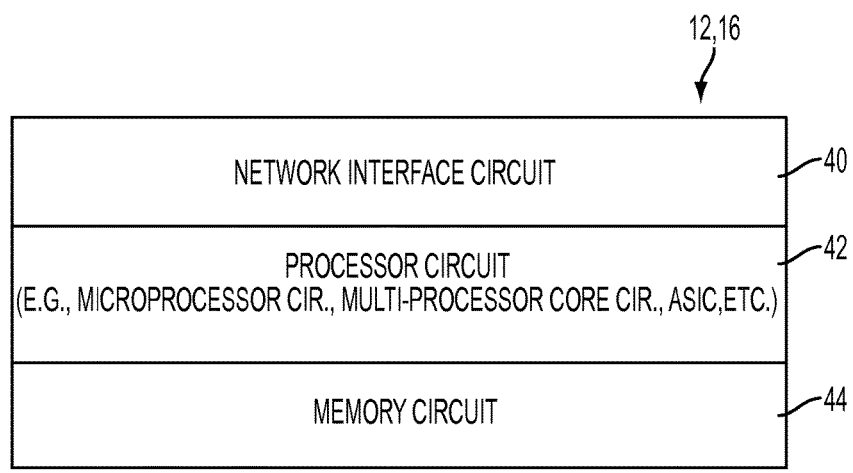
FIG. 2 is a diagram illustrating any one of the devices of FIG. 1, according to an example embodiment.

FIG. 2 illustrates an example implementation of any one of the devices 12 and/or 16, of FIG. 1, according to an example embodiment. Each apparatus 12 and/or 16 is a physical machine (i.e., a hardware device) configured for implementing network communications with other physical machines 12 and/or 16 via the network 10. The term "configured for" or "configured to" as used herein with respect to a specified operation refers to a device and/or machine that is physically constructed and arranged to perform the specified operation. Hence, the apparatus 12 and/or is a network-enabled (user machine providing user access to a network)/machine implementing network communications via the network 10.

Each apparatus 12 and/or 16 can include a device interface circuit 40, a processor circuit 42, and a memory circuit 44. The device interface circuit 40 can include one or more distinct physical layer transceivers for communication with any one of the other devices 12 and/or 16; the device interface circuit 40 also can include an IEEE based Ethernet transceiver for communications with the devices of FIG. 1 via any of the links 14 and/or 18 (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12 and/or 16 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
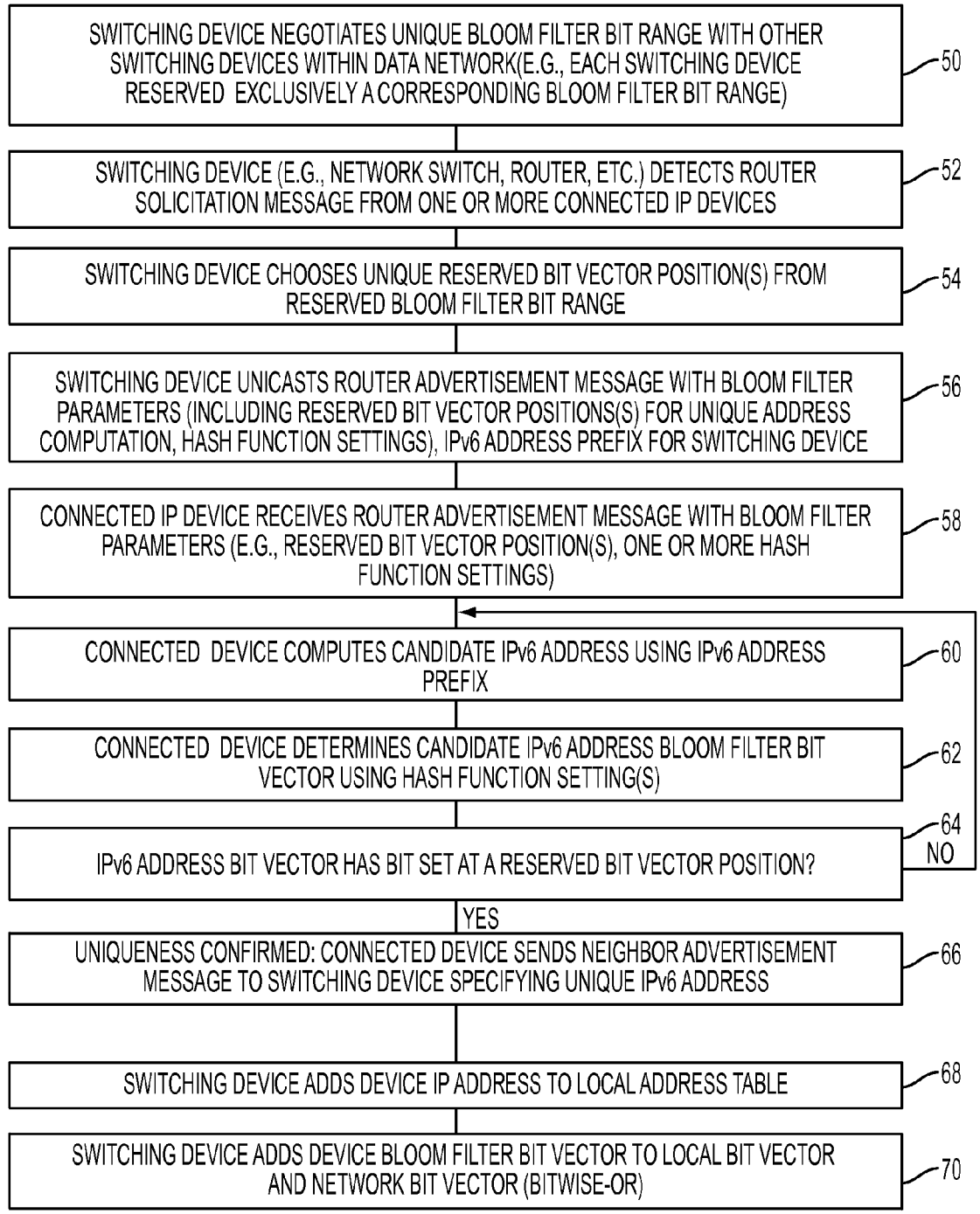
FIG. 3 illustrates an example method of providing Bloom filter parameters to a network device for unique address computation by the network device, according to an example embodiment.
Figure 4:
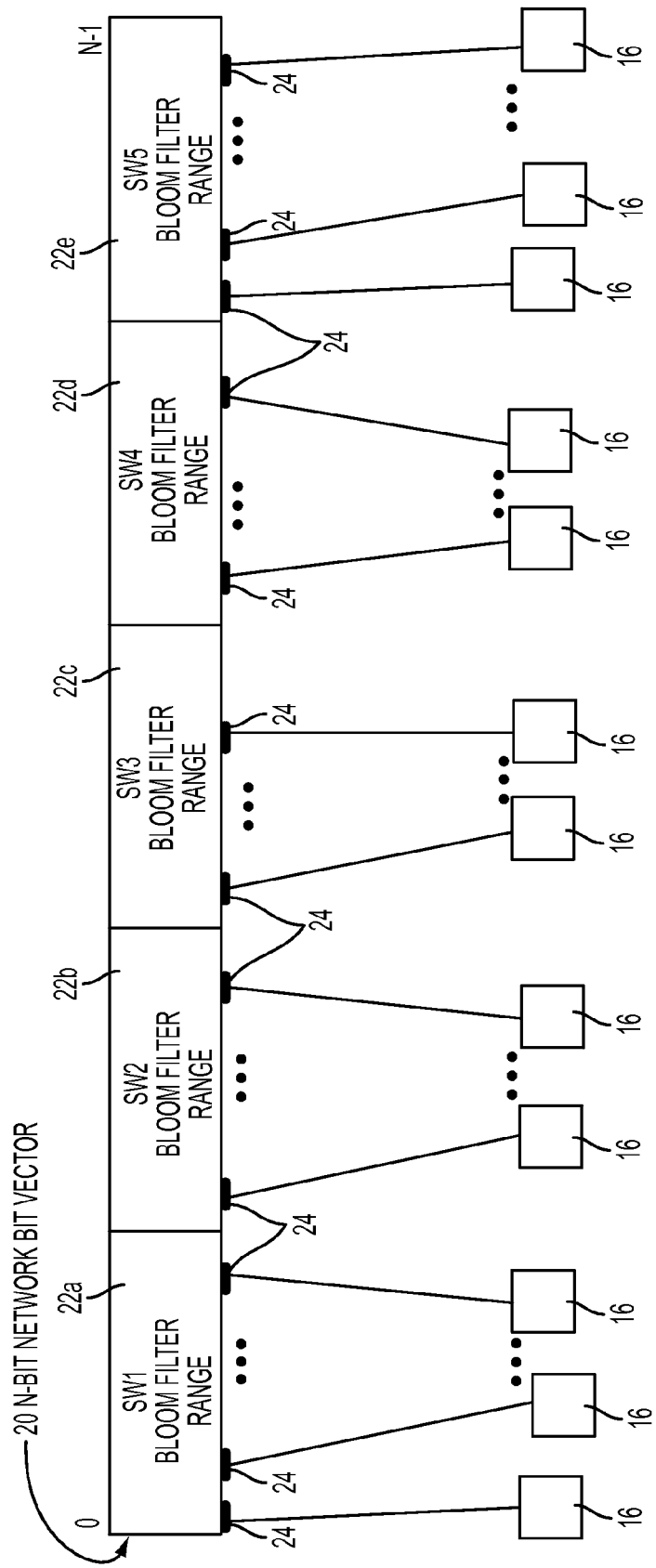
FIG. 4 illustrates an example allocation of reserved Bloom filter bit positions for address computation by a network device, according to an example embodiment.

FIG. 3 illustrates an example method of providing Bloom filter parameters to a network device for unique address computation by the network device, according to an example embodiment. FIG. 4 illustrates an example allocation of reserved Bloom filter bit positions for address computation by a network device, according to an example embodiment. FIG. 5 illustrates an example advertisement message providing Bloom filter parameters to a network device for unique address computation by the network device, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3, the processor circuit 42 of each switching device (e.g., SW1) 12 in operation 50 can allocate, from an N-bit Bloom filter bit vector 20 (FIG. 4), a prescribed Bloom filter bit range (e.g., 22*a*) that is reserved exclusively to the corresponding switching device (e.g., SW1) 12. As illustrated in FIG. 4, each Bloom filter bit range 22 is a subset of the entire N-bit network Bloom filter bit vector range 20. The Bloom filter bit ranges 22*a*, 22*b*, 22*c*, 22*d*, and 22*e* are reserved exclusively for the switching devices SW1, SW2, SW3, SW4, and SW5; hence, the switching device SW1 12 does not allow any attached network device 16 to use a network device address mapped to a Bloom filter bit vector having a bit set outside the prescribed Bloom filter bit range 22*a*; similarly, the switching devices SW2, SW3, SW4, and SW5 do not allow any network device address mapped to a bit set outside the respective ranges 22*b*, 22*c*, 22*d*, and 22*e*. The size of the ranges 22 can be based on the number "J" of switching devices 12 within the domain of the network 10 relative to the N-bit network bit vector 20, where the size of each bit range 22 (Nsw) can equal the number of bits N divided by the number (J) of switching devices 12, i.e., "Nsw=N/J".

The processor circuit 42 of the switching device "SW1" 12 can detect in operation 52 that one or more network devices 16 have connected to the switching device, for example in response to detecting a router solicitation message from one or more connected network devices 16. In response to detecting the network device 16, the processor circuit 42 of the switching device "SW1" can allocate in operation 54 a one or more reserved bit vector positions (24 of FIG. 4) from the reserved Bloom filter bit range 22*a* for use exclusively by the network device 16.

The processor circuit 42 of the switching device "SW1" 12 can generate in operation 56 a router advertisement message (26 of FIG. 5) containing the reserved bit vector position(s) 24 allocated exclusively to the one network device 16: the router advertisement message 26 is unicast to the network device 16 for use only by the network device 16.

Figure 5:
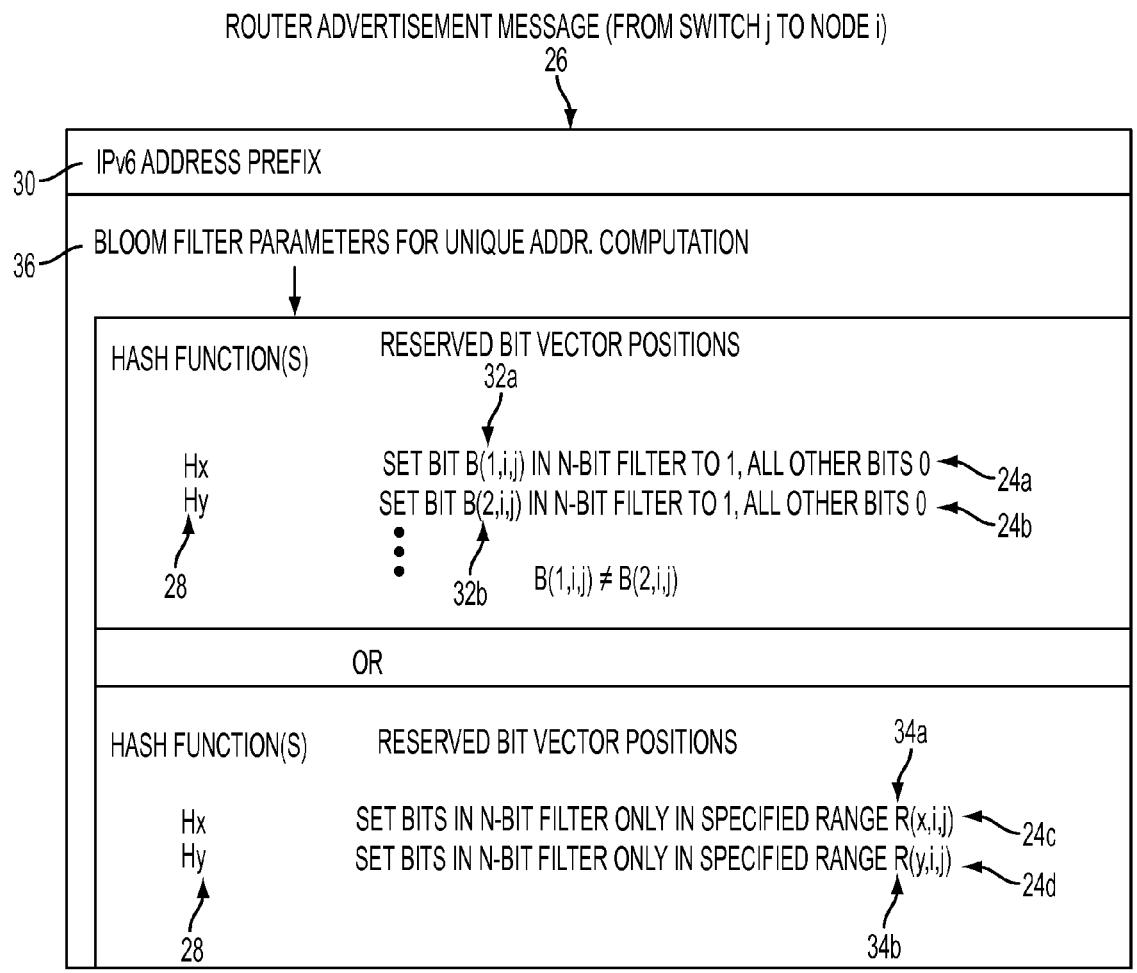
FIG. 5 illustrates an example advertisement message providing Bloom filter parameters to a network device for unique address computation by the network device, according to an example embodiment.

FIG. 5 illustrates an example router advertisement message 26, generated by the switching device "SW1", containing Bloom filter parameters 36 enabling unique address autoconfiguration by a network device 16. The Bloom filter parameters 36 can include reserved bit vector position(s) 24 allocated exclusively to the one network device 16. The Bloom filter parameters 36 also can specify the hash functions 28 used to generate the Bloom filter bit vector. The router advertisement also can specify a network address prefix (e.g., an IPv6 address prefix) 30 to be used for address autoconfiguration.

As illustrated in FIG. 5, the router advertisement message 26 can specify one or more hash functions "Hx", "Hy" used for mapping a candidate autoconfigured address to a corresponding one or more bits in the N-bit Bloom filter bit vector. The reserved bit vector position(s) 24 can specify either specific bits 32 to be set in the N-bit Bloom filter bit vector, or a specified range 34. In particular, the reserved bit vector position 24a illustrates that a specific bit "B(1, i, j)" 32a is to be set to "1" in the N-bit Bloom filter bit vector 20, where "1" identifies a first reserved bit allocation, "i" identifies the network device (i.e., "node") "i", and "j" identifies the switch "j". Hence, the specific bit "B(1, i, j)" 32a identifies a first reserved bit reserved exclusively for node "i" 16 attached to switching device "j" 12. Similarly, the reserved bit vector position 24b illustrates that a specific bit "B(2, i, j)" 32b (that is not the same bit as "B(1, i, j)" 32a) is reserved exclusively for node "i" 16 attached to switching device "j" 12. Additional reserved bit vector positions can be allocated to increase the number of available reserved bit vector positions that satisfy the uniqueness requirement.

Hence, any candidate address autoconfigured by node "i" 16 attached to switching device "j" 12 must be mapped by the any one of the hash functions "Hx" or "Hy" to a Bloom filter bit vector having a bit set at (i.e., within) at least one of the reserved bit vector positions "B(1, I, j")", "B(2, i, j)", etc., before the node "i" can use the autoconfigured address. In other words, a candidate address can be used so long as any one of the hash functions sets a bit at one or more of the reserved bit vector positions 24. The reserved bit vector position(s) 24 also can be expressed as a sequence of integer values (e.g., "5, 7, 12-14. 17, 201") identifying the respective reserved positions (e.g., positions "5". "7", "12", "13", "14", "17" and "201" (decimal)).

In the case of the router advertisement message 26 specifying reserved bit vector position(s) 24c and 24d in the form of uniquely reserved ranges 34a and 34b, the range 34a can specify that any candidate address autoconfigured by node "i" 16 attached to switching device "j" 12 must be mapped by the hash function "Hx" or "Hy" to set one or more bits within the range "R(x, i, j)" 34a or "R(y, i, j)" 34b. The range 34 can be a contiguous portion of bits, for example bits 0-15 in the portion 22a reserved exclusively by the switch device "SW1" 12. The size (N_device) of the range 34 can be based on the size (Nsw) of the portion 22 reserved exclusively by the switch device 12 divided by the maximum number of devices "I_max" allowed to join a switch, where:

$N\_device = Nsw/I\_max.$

Hence, each network device 16 can be reserved exclusively one or more reserved bit vector positions 24 that provide uniqueness of any candidate IPv6 address within the domain of the network 10.

Referring to FIG. 3, the device interface circuit of the requesting network device 16 receives in operation 58 the router advertisement message 26 specifying the Bloom filter parameters 36, for example including one or more reserved bit vector positions 24 and hash function settings 28 to be used to generate the Bloom filter bit vector.

The processor circuit 42 of the connected network device 16 generates in operation 60 an autoconfigured candidate IPv6 address using the IPv6 address prefix 30 specified in the router advertisement message 26. The processor circuit 42 of the connected network device in operation 62 generates a Bloom filter bit vector for the candidate IPv6 address (i.e., a "candidate IPv6 Bloom filter bit vector" or "IPv6 address bit vector") based on applying the Bloom filter parameters 36, including the hash function settings 28 specified in the Bloom filter parameters 36 of the router advertisement message 26.

The processor circuit 42 of the connected network device 16 determines in operation 64 whether the IPv6 address bit vector has one or more bits that are set at one or more reserved bit vector positions 24 reserved for the network device 16. If in operation 64 the processor circuit 42 determines the corresponding Bloom filter bit vector of the candidate IPv6 address does not have at least one set bit at one of the reserved bit vector positions reserved for the network device 16, the processor circuit 42 repeats the autoconfiguring in operation 60 to retry obtaining the unique IPv6 address.

If in operation 64 the Bloom filter bit vector of the candidate IPv6 address has at least one bit set at a reserved bit vector position that is reserved for the network device 16 that provides uniqueness, the processor circuit 42 in operation 66, having confirmed uniqueness of the autoconfigured IPv6 address, can send a neighbor advertisement message to the switching device 12 specifying the unique IPv6 address. The neighbor advertisement message also can specify one or more unused bit vector positions that were reserved for the network device 16 but that were not set in the Bloom filter bit vector of the candidate IPv6 address, enabling the switching device 12 to reserve the unused bit vector position for another network device 16.

If preferred the switching device 12 also can test the uniqueness of the IPv6 address relative to the reserved bit position(s) 24, for example to enforce the uniqueness requirement and/or to ensure a rogue network device 16 does not use an improper IPv6 address: the IPv6 address uniqueness can be tested based on storing the router advertisement message in a pending cache having a prescribed timeout interval (e.g., 2 minutes), prior to the switching device 12 storing the unique IPv6 address in a local address table in operation 68. The testing can be done for each IPv6 address prefix, randomly, or periodically, as preferred.

The switching device in operation 70 also can add the device bloom filter bit vector to a local switch-specific bit vector maintained by the switch for connected network devices 16, and/or a network-wide bit vector based on executing a bitwise-OR operation on a collection of switch-specific bit vectors.

According to example embodiments, each network devices in a network can be allocated unique Bloom filter bit positions that enable a network device to autoconfigure an address that is unique within the network. The requirement that the network device autoconfigures a network address that is unique within the network eliminates the necessity of duplicate address detection, ensuring large-scale networks can be scalable with minimal network load during initial network deployment. The example embodiments are particularly effective in IoT networks, implementing a routing protocol for low-power and lossy networks (RPL) according to RFC 6775, since ranges of Bloom filter bit positions can be delegated by a router to its child nodes, enabling the child nodes to further sub-delegate the delegated ranges of Bloom filter bit positions.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
generating, by a network device, a Bloom filter bit vector based on applying Bloom filter parameters to a candidate address autoconfigured by the network device; and
selectively repeating, by the network device, the autoconfiguring of the candidate address until the corresponding Bloom filter bit vector includes a bit set at a reserved bit vector position that is reserved for the network device, the reserved bit vector position providing uniqueness of the candidate address within a link layer domain.

2. The method of claim 1, further comprising:
the network device receiving, from a second network device, a unicast message specifying the Bloom filter parameters and one or more of the reserved bit vector positions;
the one or more reserved bit vector positions having been reserved for the network device by the second network device within the link layer domain.

3. The method of claim 2, wherein the Bloom filter parameters specify a bit-length of the Bloom filter bit vector to be generated by the network device, and one or more hash functions for generating the corresponding Bloom filter bit vector.

4. The method of claim 1, wherein one or more of the reserved bit vector positions reserved for the network device in the Bloom filter bit vector is identified based on one of:
specific bit positions in the Bloom filter bit vector to be set to 1 and reserved for the network device, and all other bits to be set to 0; or
at least one contiguous group of bit positions in the Bloom filter bit vector reserved for the network device.

5. An apparatus comprising:
a memory circuit configured for storing Bloom filter parameters and an identification of one or more reserved bit vector positions that are reserved for the apparatus; and
a processor circuit configured for generating a Bloom filter bit vector based on applying the Bloom filter parameters to a candidate address autoconfigured by the processor circuit;
the processor circuit further configured for selectively repeating the autoconfiguring of the candidate address until the corresponding Bloom filter bit vector includes a bit set at at least one of the reserved bit vector positions, the at least one reserved bit vector position providing uniqueness of the candidate address within a link layer domain.

6. The apparatus of claim 5, further comprising a device interface circuit configured for receiving, from a network device, a unicast message specifying the Bloom filter parameters and the identification of one or more reserved bit vector positions, the identification of one or more reserved bit vector positions having been reserved for the apparatus by the network device within the link layer domain.

7. The apparatus of claim 6, wherein the Bloom filter parameters specify a bit-length of the Bloom filter bit vector to be generated by the network device, and one or more hash functions for generating the corresponding Bloom filter bit vector.

8. The apparatus of claim 5, wherein one or more of the reserved bit vector positions reserved for the network device in the Bloom filter bit vector is identified based on one of:
specific bit positions in the Bloom filter bit vector to be set to 1 and reserved for the network device, and all other bits to be set to 0; or
at least one contiguous group of bit positions in the Bloom filter bit vector reserved for the network device.

9. Logic encoded in one or more non-transitory physical storage media for execution by a machine and when executed by the machine operable for:
generating, by a network device, a Bloom filter bit vector based on applying Bloom filter parameters to a candidate address autoconfigured by the network device; and
selectively repeating, by the network device, the autoconfiguring of the candidate address until the corresponding Bloom filter bit vector includes a bit set at a reserved bit vector position that is reserved for the network device, the reserved bit vector position providing uniqueness of the candidate address within a link layer domain.

10. A method comprising:
allocating, by a first network device, one or more reserved bit vector positions to a second network device having connected to the first network device; and
the first network device sending a message specifying at least the one or more reserved bit vector positions to the second network device, enabling the second network device to autoconfigure an address that is unique within a link layer domain of the first network device, the second network device able to identify the address as unique based on determining that applying Bloom filter parameters to the address results in a Bloom filter bit vector having at least one bit set at the one or more reserved bit vector positions.

11. The method of claim 10, further comprising:
allocating the one or more reserved bit vector positions within the link layer domain;
the message sent to the second network device as a unicast message specifying the Bloom filter parameters and the one or more reserved bit vector positions.

12. The method of claim 11, wherein the Bloom filter parameters specify a bit-length of the Bloom filter bit vector to be generated by the network device, and one or more hash functions for generating the corresponding Bloom filter bit vector.

13. The method of claim 10, wherein the one or more reserved bit vector positions in the Bloom filter bit vector is identified based on one of:
specific bit positions in the Bloom filter bit vector to be set to 1 and reserved for the network device, and all other bits to be set to 0; or
at least one contiguous group of bit positions in the Bloom filter bit vector reserved for the network device.

14. The method of claim 10, further comprising:
allocating prescribed Bloom filter bit ranges among the first network device and other network devices in a network, the first network device utilizing a corresponding prescribed Bloom filter bit range reserved exclusively to the first network device; and
allocating the one or more reserved bit vector positions to the second network device from the corresponding prescribed Bloom filter bit range, ensuring the address autoconfigured by second the network device is unique within a domain of the network.

15. An apparatus comprising:
a processor circuit configured for allocating one or more reserved bit vector positions to a network device having connected to the apparatus; and
a device interface circuit configured for sending a message specifying at least the one or more reserved bit vector positions to the network device, enabling the network device to autoconfigure an address that is unique within a link layer domain of the apparatus, the network device able to identify the address as unique based on determining that applying Bloom filter parameters to the address results in a Bloom filter bit vector having at least one bit set at the one or more reserved bit vector positions.

16. The apparatus of claim 15, wherein the processor circuit is further configured for allocating the one or more reserved bit vector positions within the link layer domain, the message sent to the network device as a unicast message specifying the Bloom filter parameters and the one or more reserved bit vector positions.

17. The apparatus of claim 16, wherein the Bloom filter parameters specify a bit-length of the Bloom filter bit vector to be generated by the network device, and one or more hash functions for generating the corresponding Bloom filter bit vector.

18. The apparatus of claim 15, wherein the one or more reserved bit vector positions in the Bloom filter bit vector is identified based on one of:
specific bit positions in the Bloom filter bit vector to be set to 1 and reserved for the network device, and all other bits to be set to 0; or
at least one contiguous group of bit positions in the Bloom filter bit vector reserved for the network device.

19. The apparatus of claim 15, wherein the processor circuit is configured for:
allocating prescribed Bloom filter bit ranges among the apparatus and other network devices in a network, the apparatus utilizing a corresponding prescribed Bloom filter bit range reserved exclusively to the apparatus; and
allocating the one or more reserved bit vector positions to the network device from the corresponding prescribed Bloom filter bit range, ensuring the address autoconfigured by the network device is unique within a domain of the network.

20. Logic encoded in one or more non-transitory physical storage media for execution by a machine and when executed by the machine operable for:
allocating, by a first network device, one or more reserved bit vector positions to a second network device having connected to the first network device; and
the first network device sending a message specifying at least the one or more reserved bit vector positions to the second network device, enabling the second network device to autoconfigure an address that is unique within a link layer domain of the first network device, the second network device able to identify the address as unique based on determining that applying Bloom filter parameters to the address results in a Bloom filter bit vector having at least one bit set at the one or more reserved bit vector positions.

* * * * *

UNITED STATES PATENT AND TRADEMARK OFFICE
CERTIFICATE OF CORRECTION

PATENT NO. : 9,608,863 B2
APPLICATION NO. : 14/516799
DATED : March 28, 2017
INVENTOR(S) : Eric Michel Levy-Abegnoli, Pascal Thubert and Patrick Wetterwald Page 1 of 1

It is certified that error appears in the above-identified patent and that said Letters Patent is hereby corrected as shown below:

In the Claims

Column 10 Claim 12, Line 57, after "the" insert --second--

Column 10 Claim 13, Line 64, after "the" insert --second--

Column 10 Claim 13, Line 66, after "the" insert --second--

Column 11 Claim 14, Line 10, after "by" insert --the--

Column 11 Claim 14, Line 10, after "second" delete "the"

Signed and Sealed this
Sixth Day of February, 2018

Joseph Matal
*Performing the Functions and Duties of the*
*Under Secretary of Commerce for Intellectual Property and*
*Director of the United States Patent and Trademark Office*